(12) United States Patent
Murase

(10) Patent No.: US 12,049,094 B2
(45) Date of Patent: Jul. 30, 2024

(54) IMAGE FORMING APPARATUS, INK SET, AND IMAGE FORMING METHOD

(71) Applicant: BROTHER KOGYO KABUSHIKI KAISHA, Nagoya (JP)

(72) Inventor: Mami Murase, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 329 days.

(21) Appl. No.: 17/708,236

(22) Filed: Mar. 30, 2022

(65) Prior Publication Data
US 2022/0219475 A1 Jul. 14, 2022

Related U.S. Application Data

(63) Continuation of application No. PCT/JP2021/027105, filed on Jul. 20, 2021.

(30) Foreign Application Priority Data

Jul. 30, 2020 (JP) .................. 2020-129081

(51) Int. Cl.
| | | |
|---|---|---|
| *B41J 2/21* | (2006.01) | |
| *B41J 3/407* | (2006.01) | |
| *B41M 5/00* | (2006.01) | |
| *C09D 11/023* | (2014.01) | |
| *C09D 11/102* | (2014.01) | |

(Continued)

(52) U.S. Cl.
CPC .......... *B41M 5/0023* (2013.01); *B41J 2/2107* (2013.01); *B41J 3/4078* (2013.01);
(Continued)

(58) Field of Classification Search
CPC . B41J 2/01; B41J 2/2107; B41J 2/2114; B41J 3/4078; B41M 5/0023;
(Continued)

(56) References Cited

U.S. PATENT DOCUMENTS

| | | | |
|---|---|---|---|
| 2005/0150421 A1* | 7/2005 | Sawada .................... | D06P 5/30 427/372.2 |
| 2014/0289974 A1 | 10/2014 | Okada et al. | |

(Continued)

FOREIGN PATENT DOCUMENTS

| | | |
|---|---|---|
| JP | S616365 A | 1/1986 |
| JP | H06207382 A | 7/1994 |

(Continued)

OTHER PUBLICATIONS

Written Opinion and partial English translation issued in corresponding PCT Application No. PCT/JP2021/027105, dated Oct. 5, 2021 (5 pages).

(Continued)

*Primary Examiner* — Anh T Vo
(74) *Attorney, Agent, or Firm* — K&L Gates LLP

(57) ABSTRACT

The present disclosure provides an image forming apparatus that improves washing fastness of an image forming portion of a fabric on which a discharge printing ink and a color ink are ejected. An image forming apparatus of the present disclosure includes: a color ink ejector; a discharge printing ink ejector; and a controller, wherein the color ink ejector is configured to eject a color ink containing an aqueous resin emulsion on a fabric, the discharge printing ink ejector is configured to eject a discharge printing ink containing a reducing agent on the fabric, and the controller is configured to control the color ink ejector and the discharge printing ink ejector to eject the color ink on the fabric in a first step, and after the first step, to eject the discharge printing ink on the fabric in a second step.

17 Claims, 8 Drawing Sheets

(51) Int. Cl.
  *C09D 11/107* (2014.01)
  *C09D 11/38* (2014.01)
  *C09D 11/40* (2014.01)
  *D06P 1/52* (2006.01)
  *D06P 5/30* (2006.01)

(52) U.S. Cl.
  CPC .......... *C09D 11/023* (2013.01); *C09D 11/102* (2013.01); *C09D 11/107* (2013.01); *C09D 11/38* (2013.01); *C09D 11/40* (2013.01); *D06P 1/525* (2013.01); *D06P 1/5285* (2013.01); *D06P 5/30* (2013.01)

(58) Field of Classification Search
  CPC .. B41M 7/0018; C09D 11/023; C09D 11/102; C09D 11/104; C09D 11/106; C09D 11/107; C09D 11/38; C09D 11/40; C09D 11/54; D06B 19/0076; D06C 7/00; D06L 4/30; D06P 1/5221; D06P 1/525; D06P 1/5271; D06P 1/5285; D06P 1/6735; D06P 1/67375; D06P 5/30
  See application file for complete search history.

(56) References Cited

U.S. PATENT DOCUMENTS

2015/0252520 A1   9/2015   Okada et al.
2019/0301087 A1*  10/2019  Yagi .................. D06B 19/0076

FOREIGN PATENT DOCUMENTS

| JP | 2004232121 A |   | 8/2004 |   |
|---|---|---|---|---|
| JP | 2010163475 A |   | 7/2010 |   |
| JP | 2014208928 A |   | 11/2014 |   |
| JP | 2015187248 A |   | 10/2015 |   |
| JP | 201611464 | * | 1/2016 | ............... D06P 5/13 |
| JP | 2016011464 A |   | 1/2016 |   |

OTHER PUBLICATIONS

International Search Report for International Patent Application No. PCT/JP2021/027105, mailed Oct. 5, 2021 (2 pages).
Office Action issued in corresponding Japanese patent application No. 2020-129081, dated May 28, 2024 (3 pages).

* cited by examiner

IMAGE FORMING APPARATUS, INK SET, AND IMAGE FORMING METHOD

TECHNICAL FIELD

The present disclosure relates to an image forming apparatus, an ink set, and an image forming method.

BACKGROUND ART

A technique for forming an image by ejecting a discharge printing ink and a color ink on a fabric such as clothes is known by reference to Patent Literature 1 and the like.

CITATION LIST

Patent Literature

Patent Literature 1: JP 2004-232121 A

SUMMARY OF INVENTION

Technical Problem

However, in the above-mentioned technique, there is a problem in that the color ink is easily peeled off at the time of washing, and the washing fastness of the image-formed area is impaired.

With the foregoing in mind, it is an object of the present disclosure to provide an image forming apparatus, an ink set, and an image forming method that improve washing fastness of an image forming portion of a fabric on which a discharge printing ink and a color ink are ejected.

Solution to Problem

In order to achieve the aforementioned object, the present disclosure provides an image forming apparatus, including: a color ink ejector; a discharge printing ink ejector; and a controller, wherein the color ink ejector is configured to eject a color ink containing an aqueous resin emulsion on a fabric, the discharge printing ink ejector is configured to eject a discharge printing ink containing a reducing agent on the fabric, and the controller is configured to control the color ink ejector and the discharge printing ink ejector to eject the color ink on the fabric in a first step, and after the first step, to eject the discharge printing ink on the fabric in a second step.

The present disclosure also provides an image forming method, including: a first step of ejecting a color ink containing an aqueous resin emulsion on a fabric; and a second step of ejecting a discharge printing ink containing a reducing agent on the fabric, wherein the second step is performed after performing the first step.

Advantageous Effects of Invention

The image forming apparatus, the ink set, and the image forming method of the present disclosure improve the washing fastness of the image forming portion of the fabric on which the discharge printing ink and the color ink are ejected.

DESCRIPTION OF EMBODIMENTS

Figure 1:
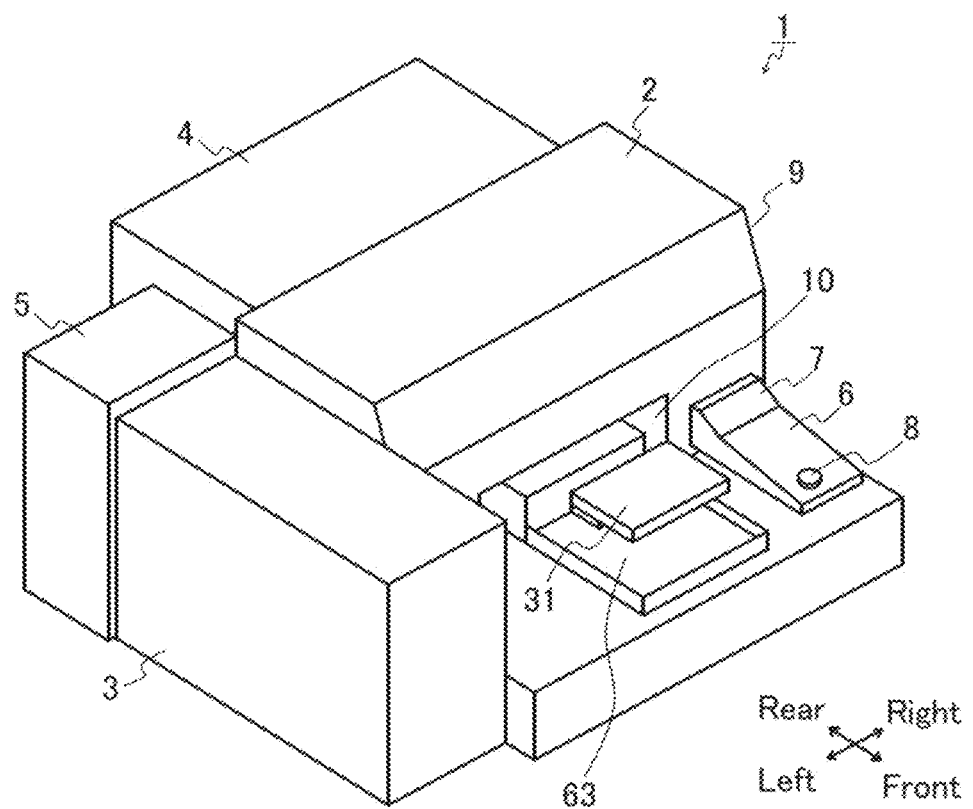
FIG. 1 is a schematic perspective view illustrating the configuration of an example of an image forming apparatus according to the present disclosure.

The image forming apparatus of the present disclosure includes: a color ink ejector; a discharge printing ink ejector; and a controller, wherein the color ink ejector is configured to eject a color ink containing an aqueous resin emulsion on a fabric, the discharge printing ink ejector is configured to eject a discharge printing ink containing a reducing agent on the fabric, and the controller is configured to control the color ink ejector and the discharge printing ink ejector to eject the color ink on the fabric in a first step, and after the first step, to eject the discharge printing ink on the fabric in a second step.

The color ink includes an aqueous resin emulsion. The other configuration of the color ink is not particularly limited. The aqueous resin emulsion is composed of, for example, resin fine particles and a dispersion medium such as water, and the resin fine particles are dispersed with a specific particle diameter rather than in a dissolved state in the dispersion medium. Examples of the aqueous resin emulsion include an acrylic resin emulsion, a urethane resin emulsion, a polyester resin emulsion, and a polystyrene resin emulsion. One kind of the aqueous resin emulsions may be used alone, or two or more of them may be used in combination. The aqueous resin emulsion is preferably a urethane resin emulsion, for example.

Examples of the urethane resin emulsion include a polycarbonate-based urethane resin emulsion, a polyester-based urethane resin emulsion, and a polyether-based urethane resin emulsion. Since the urethane resin emulsion is a polyester-based urethane resin emulsion, for example, washing fastness of an image forming portion is good. Since the urethane resin emulsion is a polycarbonate-based urethane resin emulsion, for example, washing fastness of an image forming portion is even better and storage stability is good. Since the urethane resin emulsion is a polyether-based urethane resin emulsion, for example, by performing the second step after the first step, the effect of improving washing fastness is large, and storage stability is good.

As the resin emulsion, for example, a commercially available product may be used. Examples of the commercially available product of a polycarbonate-based urethane resin emulsion include "SUPERFLEX® 460" produced by DKS Co., Ltd., "TAKELAC® W-6110" produced by Mitsui Chemicals, Inc., and "HYDRAN® WLS-210" produced by DIC Co., Ltd.; examples of the commercially available product of a polyester-based urethane resin emulsion include "UCOAT® UWS-145" produced by Sanyo Chemical Industries, Ltd., "TAKELAC® W-5030" produced by Mitsui Chemicals, Inc., and "HYDRAN® HW-920" produced by DIC Co., Ltd.; and examples of the commercially available product of a polyether-based urethane resin emulsion include "TAKELAC® W-6061T" produced by Mitsui Chemicals, Inc., and "HYDRAN® FCS-855" and "HYDRAN® WLS-201" produced by DIC Corporation.

The color ink may contain, for example, a pigment, a dye, and the like as a coloring agent. The color ink contains, for example, a pigment. The pigment is not particularly limited, and examples thereof include carbon black, an inorganic pigment, and an organic pigment. Examples of the carbon black include furnace black, lamp black, acetylene black, and channel black. Examples of the inorganic pigment include titanium oxide, an iron oxide-based inorganic pigment, and a carbon black-based inorganic pigment. Examples of the organic pigment include azo pigments such as azolakes, insoluble azo pigments, condensed azo pigments, and chelating azo pigments; polycyclic pigments such as phthalocyanine pigments, perylene and perinone pigments, anthraquinone pigments, quinacridone pigments, dioxazine pigments, thioindigo pigments, isoindolinone pigments, and quinophthalone pigments; dye lake pigments such as basic dye type lake pigments and acid dye type lake pigments; nitro pigments; nitroso pigments; and aniline black daylight fluorescent pigments. Examples of pigments other than these include C. I. Pigment Black 1, 6 and 7; C.I. Pigment Yellow 1, 2, 3, 12, 13, 14, 15, 16, 17, 55, 74, 78, 150, 151, 154, 180, 185 and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C.I. Pigment Violet 19 and 196; C.I. Pigment Blue 1, 2, 3, 15, 15:1, 15:2, 15:3, 15:4, 16, 22, and 60; C.I. Pigment Green 7 and 36; and solid solutions of these pigments. One kind of the coloring agents may be used alone, or two or more of them may be used in combination.

The content of the resin emulsion and the content of the coloring agent in the total amount of the color ink is not particularly limited. The content of the resin fine particles contained in the resin emulsion in the total amount of the color ink may be, for example, 1 mass % to 15 mass %. The solid content of the pigment may be, for example, 1 mass % to 15 mass %.

The color ink is, for example, an ink which is aggregated by the discharge printing ink. Examples of the ink which is aggregated by the discharge printing ink include inks that use "SUPERFLEX® 460, "TAKELAC® W-6110", "HYDRAN® WLS-210", "UCOAT® UWS-145", "TAKELAC® W-5030", "TAKELAC® W-6061T", "HYDRAN® FCS-855", "HYDRAN® WLS-201", and the like as the resin emulsion. Since the color ink is an ink which is aggregated by the discharge printing ink, for example, the washing fastness may be further improved, and moreover, the bleeding of the image forming portion may be reduced and the image quality may be improved.

The color ink may further contain, for example, water, as well as other components such as a humectant and a surfactant.

The discharge printing ink contains a reducing agent. Other configuration of the discharge printing ink is not particularly limited. Examples of the reducing agents include sodium hydrosulfite, thiourea dioxide, rongalite, sodium nitrite, sodium bisulfite, sodium thiosulfate, and sodium pyrosulfite. The reducing agent is, for example, thiourea dioxide. Since the reducing agent is thiourea dioxide, for example, it is good in terms of smell (for example, formaldehyde is not generated) and storage stability.

The concentration of the reducing agent in the total amount of the discharge printing ink is not particularly limited, and may be, for example, 0.28 mol/l to 0.70 mol/l.

The discharge printing ink may further contain, for example, water, as well as other components such as a humectant and a surfactant.

The combination of the color ink and the discharge printing ink is not particularly limited, and may be the combination of the color ink and the discharge printing ink described above. The combination of the color ink and the discharge printing ink may be, for example, the combination in which the aqueous resin emulsion contained in the color ink is a urethane resin emulsion and the reducing agent contained in the discharge printing ink is thiourea dioxide.

The fabric includes both knitted and woven fabrics. The material of the fabric may be natural fibers. Examples of the natural fiber include cotton and silk.

Next, an image forming apparatus of the present disclosure will be described. The image forming apparatus of the present disclosure may be of an integral-type including a color ink ejector, a discharge printing ink ejector, and a controller inside one casing or a system independently including the color ink ejector, the discharge printing ink ejector, and the controller.

FIG. 1 shows an example of the configuration of the integral-type image forming apparatus. As shown in FIG. 1, the image forming apparatus 1 includes an ink set storage 2, an ink ejector 3, a heat treatment section 4, and a controller 5. The heat treatment section 4 may have any configuration and may not be included in the apparatus 1.

The ink set storage 2 is configured to store an ink set. The ink set includes the color ink and the discharge printing ink. Note that, the ink set storage 2 may include, for example, a color ink set storage configured to store an ink set of the color ink and a discharge printing ink set storage configured to store an ink set of the discharge printing ink, separately.

The ink ejector 3 also serves as the color ink ejector and the discharge printing ink ejector. Inside the ink ejector 3, an ink ejection unit is provided as described below. However, the image forming apparatus 1 is not limited to the one in which the ink ejector 3 serves as both the color ink ejector and the discharge printing ink ejector. That is, the image forming apparatus 1 may include the color ink ejector and the discharge printing ink ejector as separate configurations, and a color ink ejection unit may be provided inside the color ink ejector, and a discharge printing ink ejection unit may be provided inside the discharge printing ink ejector.

Inside the heat treatment section 4, the contact heating unit is provided as described below.

The right end in front of the ink ejector 3 is provided with an operation panel 6 having a display device 7 and a button 8. The display device 7 is, for example, a liquid crystal display. The button 8 inputs an image formation start signal to the controller 5. In addition to or instead of the button 8, for example, the display device 7, which is a touch panel, may accept a user input and input an image formation start signal to the controller 5. An opening 10 through which a platen 31 and a fabric held on the platen 31 are taken in or out is provided on the front wall of the casing 9 of the ink ejector 3 and the heat treatment section 4. Hereinafter, the front, rear, left and right directions are as indicated by arrows in FIG. 1.

Figure 2:
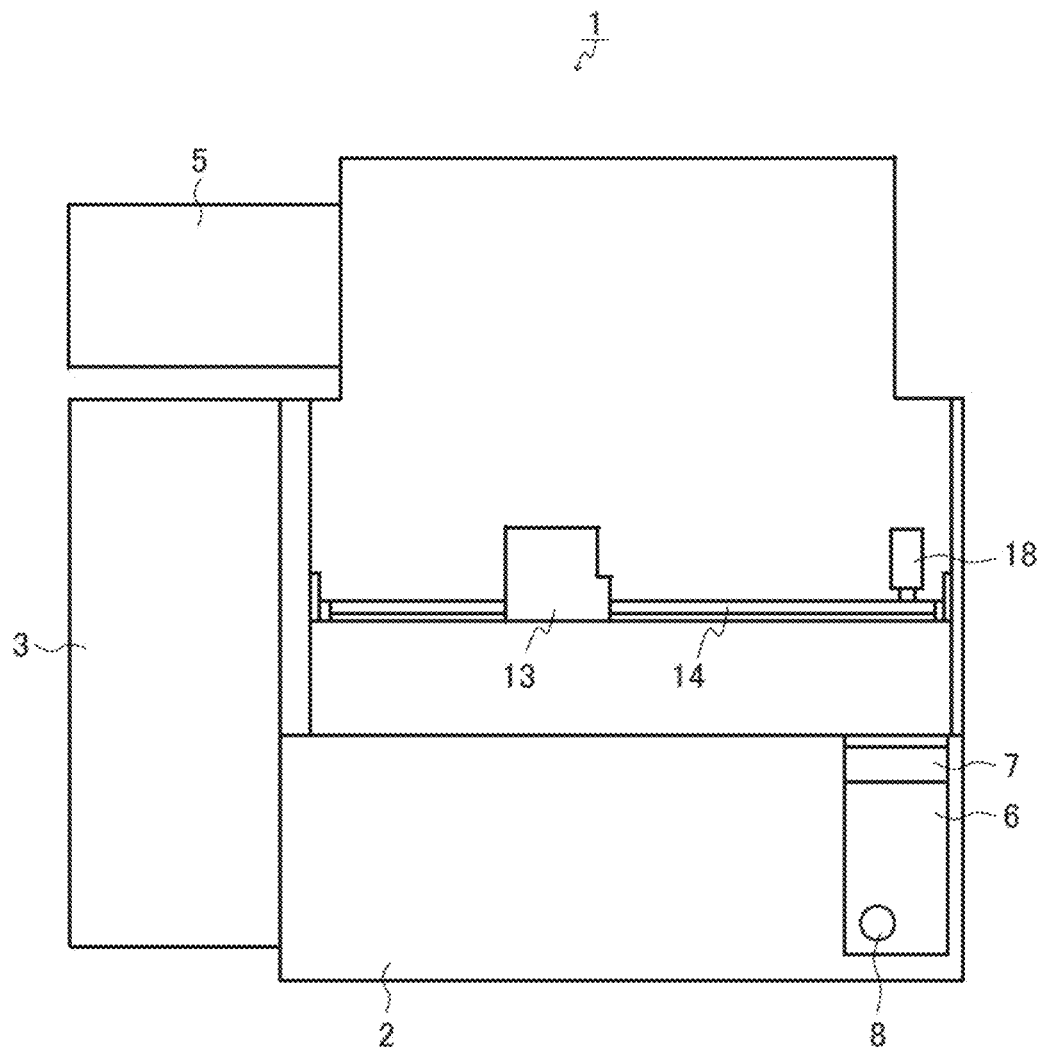
FIG. 2 is a plan view perspectively illustrating the internal structures of an ink ejector and a heat treatment section of the image forming apparatus shown in FIG. 1.
Figure 3:
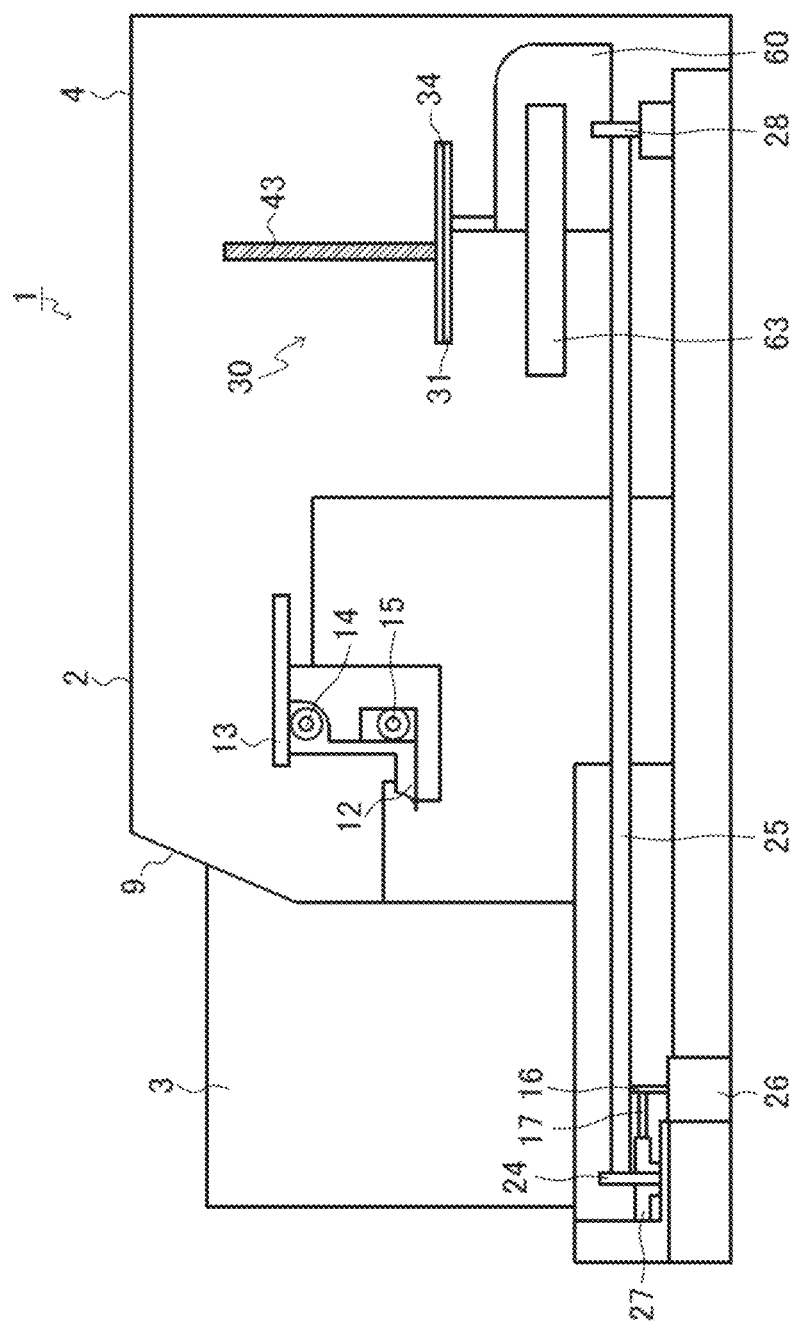
FIG. 3 is a side view perspectively illustrating the internal structures of an ink ejector and a heat treatment section of the image forming apparatus shown in FIG. 1.

FIG. 2 is a plan view and FIG. 3 is a side view perspectively illustrating the internal structure of the image forming apparatus 1 shown in FIG. 1. As shown in FIGS. 2 and 3, the inside of the ink ejector 3 is provided with an ink ejection unit (liquid ejection head) 12 having an ink-jet nozzle line and a carriage 13 including this liquid ejection head 12. A pair of upper and lower guide rods 14 and 15 for guiding the carriage 13 are respectively disposed in the left-right direction.

A carriage motor 18 composed of a stepping motor that reciprocally conveys the carriage 13 in the left-right direction is provided at a right end of the guide rods 14 and 15. The carriage 13 is linked to a belt (not shown) set to be parallel with the guide rods 14 and 15. The belt is set to a pulley (not shown) linked to the carriage motor 18 and a pulley (not shown) provided at a left end of the guide rods 14 and 15. With the driving of the carriage motor 18, the liquid ejection head 12 and the carriage 13 are conveyed along the guide rods 14 and 15 in the left-right direction (main scanning direction). The carriage 13, the guide rods 14 and 15, the carriage motor 18, the pulleys, and the belt configure a liquid ejection head conveying mechanism.

An ink storage container (ink cartridge) stored in the ink set storage 2 is connected to the liquid ejection head 12 via a supply tube. While FIGS. 1 to 3 show an example in which each of the ink ejection units is a liquid ejection head 12 having an ink-jet nozzle line, the ink ejection unit may be any unit as long as it ejects an ink on a fabric. Examples of the ejection unit include a spray, a stamp for applying an ink to a fabric, a brush, and a roller. Note that the ink ejection unit for ejecting the color ink and the ink ejection unit for ejecting the discharge printing ink may be the same or different from each other.

A pair of left and right guide rails (not shown) for guiding a moving member 60 including the platen 31 is arranged in a row in the front-rear direction at the center in the left-right direction of the ink ejector 3 and the heat treatment section 4. A tray 63 is fixed to the moving member 60 below the platen 31.

A platen motor 26 is provided near the front end of the pair of left and right guide rails. A pulley 16 is fixed to the output shaft of the platen motor 26. A pulley 27 is supported at the bottom of the applying section on the front side of the platen motor 26. A belt 17 is set over the pulley 16 and pulley 27. The pulley 27 has a pulley 24 coaxially above the pulley 27. A pulley 28 is rotatably supported at the lower part of the heat treatment section 4. A belt 25 is set over the pulley 24 and pulley 28. A moving member 60 is linked to the belt 25. The pulley 16 rotates by the rotational drive of the platen motor 26. With the rotation of the pulley 16, the pulley 24 is rotated via the belt 17. The rotation of the pulley 24 is transferred to the belt 25, and the moving member 60 is conveyed in the front-rear direction (subscanning direction) along the pair of left and right guide rails. The platen motor 26, the pair of left and right guide rails, the pulleys 16, 24, 27, and 28, and the belt 25 configure a platen conveying mechanism.

As shown in FIG. 3, the inside of the heat treatment section 4 is provided with a contact heating unit 30 configured to subject a discharge printing ink (containing reducing agent)-applied portion to contact heating to promote a reduction reaction. The contact heating unit 30 includes a heat press plate 34, an elastic support mechanism 43 for elastically supporting the heat press plate 34 so as to be slidable in the vertical direction, and a lifting drive mechanism (not shown) for vertically driving the heat press plate 34 so as to be able to move up and down detachably with respect to the surface of the fabric held by the platen 31. The heat press plate 34 may be composed of, for example, a heat insulating plate made of silicon rubber foam and a heat press section fixed to the bottom surface of the heat insulating plate. The heat press section may be composed of, for example, a heat sheet (heating section) including a nichrome wire arranged therein and a heat storage material made of iron, arranged so as to sandwich the heat sheet.

The heat treatment section 4 may further include a non-contact heating unit in the inside thereof. Examples of the non-contact heating unit include an oven and a belt conveyor oven. The non-contact heating unit may not be provided inside the heat treatment section 4 and may be provided independently from the image forming apparatus 1. Instead of the contact heating unit 30, the non-contact heating unit may heat the discharge printing ink-applied portion.

Figure 4:
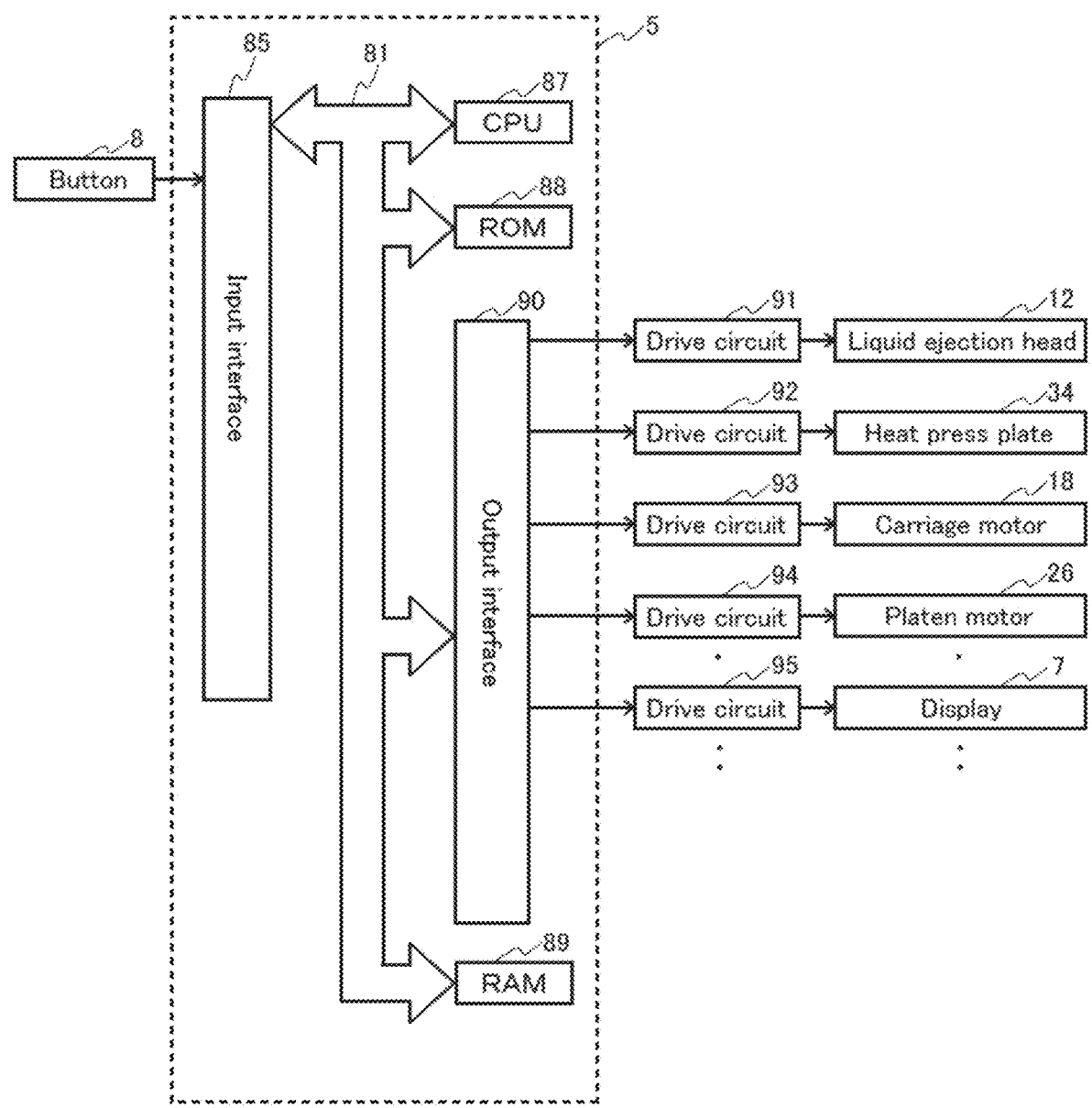
FIG. 4 is a block diagram illustrating an example configuration of a controller of the image forming apparatus shown in FIG. 1.

Next, the controller 5 will be described with reference to FIG. 4. In the controller 5, a central processing unit (CPU) 87, a read only memory (ROM) 88, a random access memory (RAM) 89, an input interface 85, and an output interface 90 are electrically connected via a bus 81. The button 8 and the like are electrically connected to the input interface 85. The liquid ejection head 12, the heat press plate 34, the carriage motor 18, the platen motor 26, the display device (display) 7, and the like are electrically connected to the output interface 90 via drive circuits 91 to 95, respectively.

The CPU 87 performs various operations and processes based on signals input with the button 8 and various programs and data stored in the ROM 88 and the RAM 89. Then, data and the like are sent to each component of the ink ejector 3 and the heat treatment section 4 via the output interface 90. The RAM 89 is a volatile storage device which is readable and writable and stores results of the operations and the like obtained in the CPU 87.

The controller 5 is configured to control the color ink ejector and the discharge printing ink ejector to eject the color ink on the fabric in the first step, and after the first step, to eject the discharge printing ink on the fabric in the second step. The first step and the second step may be repeatedly performed.

The ejection of the ink on the fabric using the image forming apparatus of the present embodiment is performed, for example, as follows. First, as the first step, a color ink containing the aqueous resin emulsion is applied (ejected) to a fabric.

More specifically, while the platen 31 and the liquid ejection head 12 are conveyed by the liquid ejection head conveying mechanism and the platen conveying mechanism, an image is printed on an image forming area of the fabric using the color ink. At least one of the ROM 88 and the RAM 89 in the controller (control unit) 5 of the image forming apparatus 1 stores various pieces of image data created by software and various pieces of data for every kind of fabric such as a T-shirt. In response to the instruction of printing by an operator, the image data is sent to the liquid ejection head 12 via the output interface 90, inks are ejected from the liquid ejection head 12 based on the image data, and an image is printed on the fabric held by the platen 31.

The amount of the color ink applied to the fabric is not particularly limited and may be, for example, 5 mg/cm$^2$ to 32 mg/cm$^2$.

Next, as the second step, the discharge printing ink containing the reducing agent is applied (ejected) to the fabric in the same manner as in the first step.

The amount of the discharge printing ink applied to the fabric is not particularly limited and may be, for example, 5 mg/cm$^2$ to 32 mg/cm$^2$.

The controller 5 may execute the second step after the first step, and the interval time between the steps is not particularly limited, and is, for example, 1 to 60 seconds.

For example, in the second step, the controller 5 may control the discharge printing ink ejector to eject the discharge printing ink on an area of the fabric on which the color ink is ejected.

Further, for example, after the first step and the second step, a heat treatment step of thermally fixing the ink to the fabric may be performed. The heat treatment step, for example, is carried out as follows. After the fabric and the platen 31 are moved to the heat treatment section 4 by the driving of the platen motor 26, the contact heating unit 30 is lowered by the lifting drive mechanism to press the fabric by the heat press plate 34 at a predetermined temperature for a predetermined time, whereby subjecting the color ink/discharge printing ink-applied portion to contact heating to promote a reduction reaction. Heating temperature and heating time in the reduction reaction promotion is not particularly limited, may be set appropriately.

The mechanism for improving the washing fastness of the fabric on which the discharge printing ink and the color ink are ejected according to the present disclosure is presumed as follows, for example. That is, a discharge printing ink is firstly ejected on a fabric, and then a color ink is ejected in the conventional method. In this method, when the color ink comes into contact with the discharge printing ink previously ejected on the fabric, aggregation of the color ink and the discharge printing ink tends to occur. Then, entanglement between the color ink and the fabric fibers becomes weak due to the occurrence of the aggregation or the like before the color ink penetrates into the fabric. Therefore, it is presumed that the color ink is washed out at the time of washing, and the washing fastness is deteriorated. In contrast, since a color ink is firstly ejected on a fiber and then a discharge printing ink is ejected in the present disclosure, it is presumed that the color ink penetrates into the fabric and prone to be entangled with the fabric fibers, thereby improving washing fastness. However, the present disclosure is not limited to the above presumption.

The present disclosure also provides an image forming method. The image forming method of the present disclosure includes a first step of ejecting a color ink containing an aqueous resin emulsion on a fabric, and a second step of ejecting a discharge printing ink containing a reducing agent on the fabric, wherein the second step is performed after performing the first step.

The image forming method of the present disclosure is performed using, for example, the image forming apparatus shown in FIGS. 1 to 4 described above. The first step and the second step are as described above.

The image forming method of the present disclosure may further include, for example, a heat treatment step of thermally fixing the ink to the fabric after the first step and the second step. The heat treatment step is as described above.

The present disclosure also provides a program for forming an image. The program of the present disclosure is a program for causing an image forming apparatus, which is a computer, to execute each step of the image forming method of the present disclosure as a procedure. In the present disclosure, the "procedure" may be read as "processing". The program of the present embodiment may be recorded on, for example, a computer-readable recording medium. The recording medium is not particularly limited, and examples thereof include a read-only memory (ROM), a hard disk (HD), and an optical disk.

The present disclosure further provides a method for producing a fabric having an image. The fabric producing method the present disclosure is a method for producing a fabric having an image, and characterized in that it includes a step of forming an image on the fabric by the image forming method of the present disclosure.

The image forming method and the fabric producing method of the present disclosure improve the washing fastness of the image forming portion of the fabric on which the discharge printing ink and the color ink are ejected.

EXAMPLES

Next, the examples are described below together with comparative examples. The present disclosure, however, is by no means limited thereto.

Example 1

(Color Ink)

As a color ink, inks (color: yellow, magenta, cyan, and black) included in commercially available ink sets A to C were used. Note that, the magenta color inks included in the ink sets A to C are hereinafter also referred to as color inks A to C, respectively.

The color inks A to C were analyzed to examine that color inks A and C contain a urethane resin and that color ink B contains an acrylic resin.

(Discharge Printing Ink)

As the discharge printing ink 1, the discharge printing ink having the following composition was prepared. A 0.6 mol/l rongalite aqueous solution was prepared as the discharge printing ink 2.

(Discharge Printing Ink 1)

| Tiourea dioxide | 6.5 wt % |
|---|---|
| Acrylamide | 8.4 wt % |
| 2-amino-2-methyl-aminopropanol | 17.5 wt % |
| Water, others | Balance |

(Image Formation)

Commercially available black T-shirts A and B (material: 100% cotton) were used as fabrics. First, color inks included in the ink sets A to C were applied to the fabrics so that each fabric has yellow, magenta, cyan, black, red, green, and blue on it. Note that, the red, green, and blue were prepared by mixing the above color inks. Thereafter, the discharge printing ink (discharge printing ink 1 or 2) was applied to a color ink-applied portion. Further, the color ink/discharge printing ink-applied portion was subjected to contact heating, thereby performing thermal fixing. The contact heating was performed using a heat press machine at 180° C. for 90 seconds. Further, as a comparative example, an image was formed on a fabric in the same manner as described above except that the discharge printing ink was applied first and then the color ink was applied.

(Washing)

A portion including the color inks-applied portion was cut out from the T-shirt and subjected to a total of five cycles of washing and drying according to AATCC 61IIA method.

(Evaluation of Washing Fastness)

The color of the color inks A to C-applied portions of the washed fabric and unwashed fabric was measured using a CIE1976L*a*b* color space scale colorimeter X-Rite939 produced by X-Rite Corporation, thereby calculating the optical density OD. The ΔOD value was calculated by the formula: ΔOD value=unwashed OD value−washed OD value. If the ΔOD value is a smaller value, it may be determined that the change in numerical value before and after washing is smaller, the peel-off of the ink is little, and the washing fastness is good.

Figure 5A:
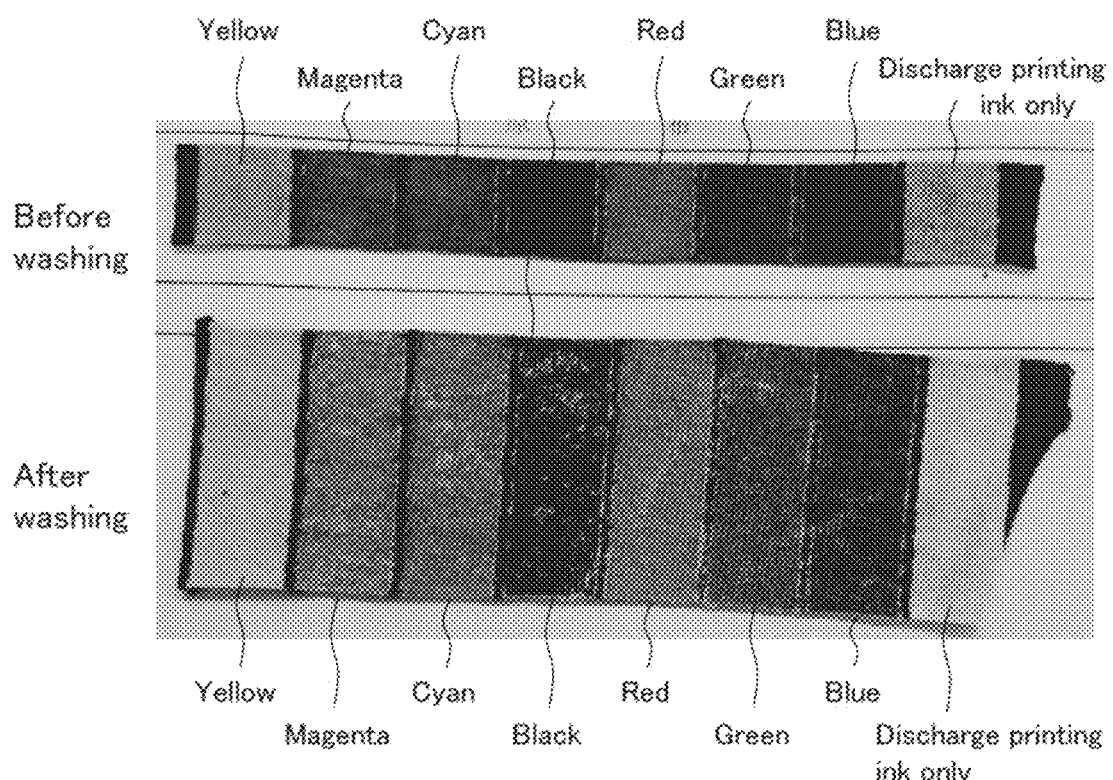
FIGS. 5A and 5B are photographs of fabrics before and after washing in Example 1.
Figure 5B:
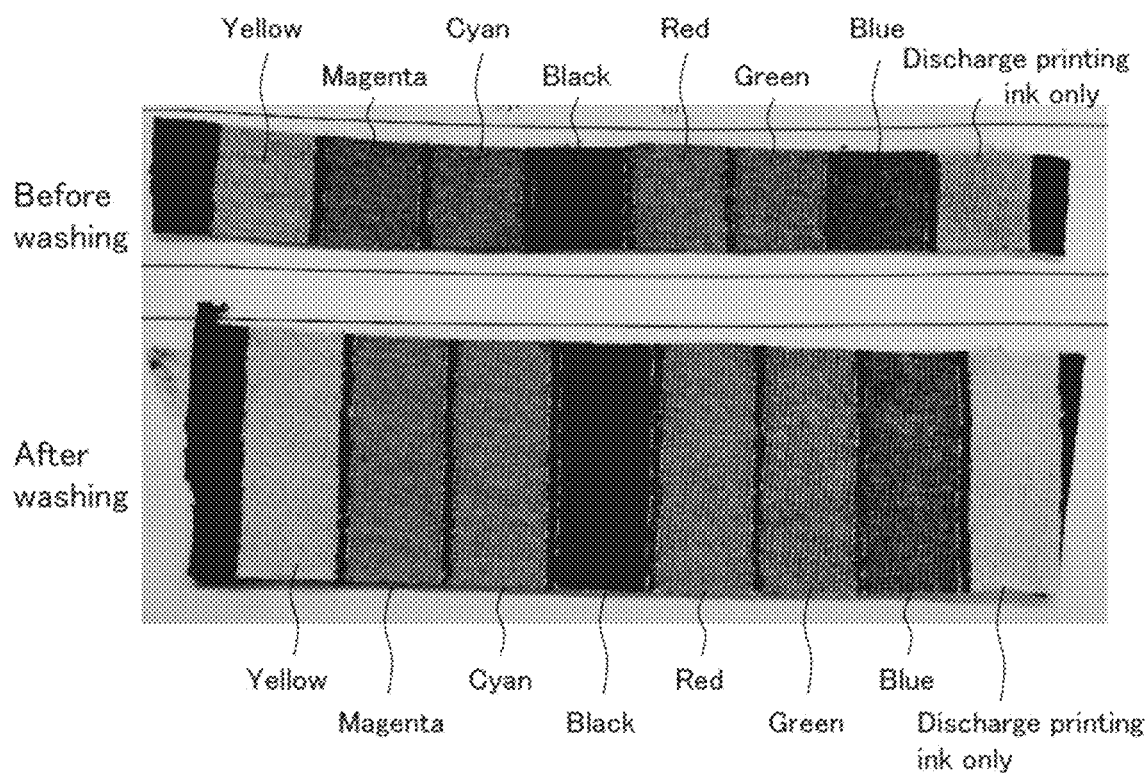

FIGS. 5A and 5B show photographs of the fabric when ink set A was used. FIG. 5A is a photograph of the fabrics of before and after washing in which inks were applied in the order of Comparative Example and FIG. 5B is a photograph of the fabrics of before and after washing in which inks were applied in the order of Example. In each of FIGS. 5A and 5B, the upper photograph shows the fabric before washing and the lower photograph shows the fabric after washing, showing the results of yellow, magenta, cyan, black, red, green, and blue from the left. In addition, the rightmost of the fabric shows the result of using only the discharge printing ink 1.

As shown in FIGS. 5A and 5B, when the fabrics of the Examples and Comparative Examples were visually examined before washing, there was no apparent difference in hue. When the optical density (OD value) before washing was compared, the values were almost the same. From this, even if the color ink was applied earlier than the discharge printing ink, there was no influence on the coloring ability of the color ink and the discharge printing ability of the discharge printing ink in the present disclosure. Further, as shown in FIGS. 5A and 5B, when the fabrics of Examples and Comparative Examples were visually examined after washing, the peel-off of the ink was observed as compared to before washing in all colors in Comparative Example. On the other hand, the peel-off of the ink was hardly observed as compared to before washing in Example.

Figure 6A:
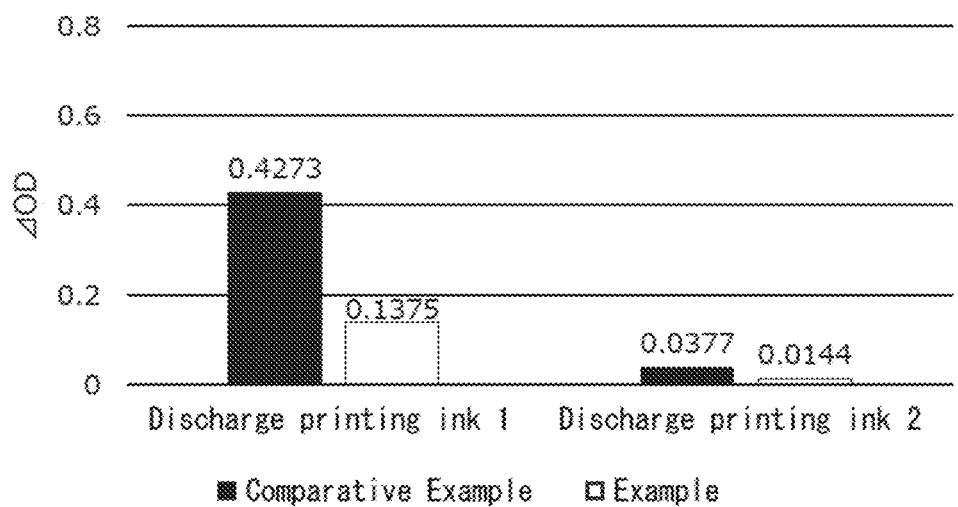
FIGS. 6A and 6B are graphs showing the results of a washing fastness evaluation in Example 1.
Figure 6B:
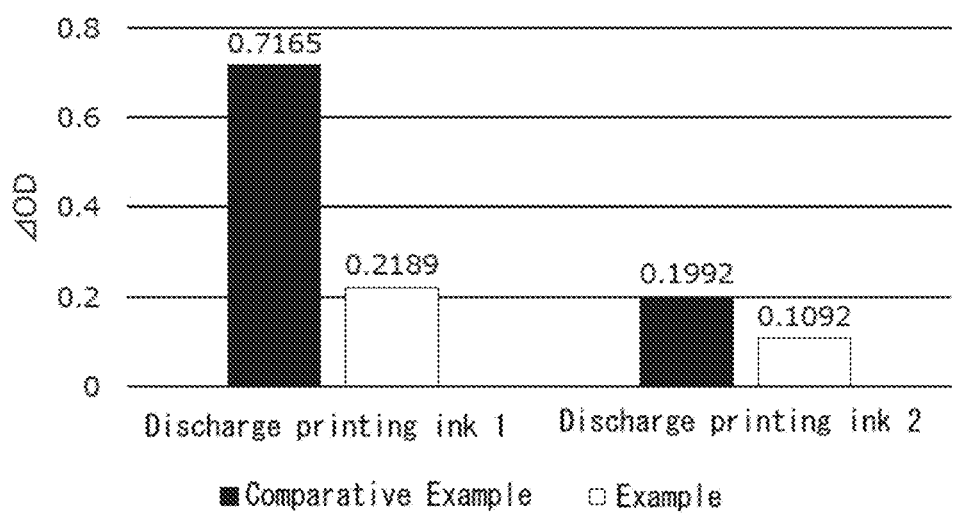

Next, the results of the evaluation of the washing fastness are shown in FIGS. 6A and 6B. FIGS. 6A and 6B are graphs showing the $\Delta OD$ value when the color ink A and the discharge printing inks 1 and 2 are used. FIG. 6A shows the result when the T-shirt A is used, and FIG. 6B shows the result when the T-shirt B is used. In each of FIGS. 6A and 6B, the horizontal axis indicates the discharge printing inks 1 and 2, in each of which the left bar indicates the result of Comparative Example and the right bar indicates the result of Example, and the vertical axis indicates the $\Delta OD$ value.

As shown in FIGS. 6A and 6B, the $\Delta OD$ value was reduced in Example as compared to in Comparative Example under both conditions. This shows that even in the case of using a discharge printing ink containing either of thiourea dioxide and rongalite as the reducing agent, the washing fastness is improved by setting the order of applying the ink as in the present disclosure.

Further, as shown in FIGS. 6A and 6B, in particular, when the discharge printing ink 1 containing thiourea dioxide as the reducing agent was used, the $\Delta$ OD value was greatly reduced in Example as compared to in Comparative Example in both of the T-shirts A and B. This shows that in the case of using a discharge printing ink containing thiourea dioxide as the reducing agent, the washing fastness is further improved by setting the order of applying the ink as in the present disclosure.

Next, the $\Delta OD$ value was calculated in the same manner as described above except that the discharge printing ink 1 was used as the discharge printing ink and color inks A and C containing a urethane resin and color ink B containing an acrylic resin were used as the color ink.

Figure 7A:
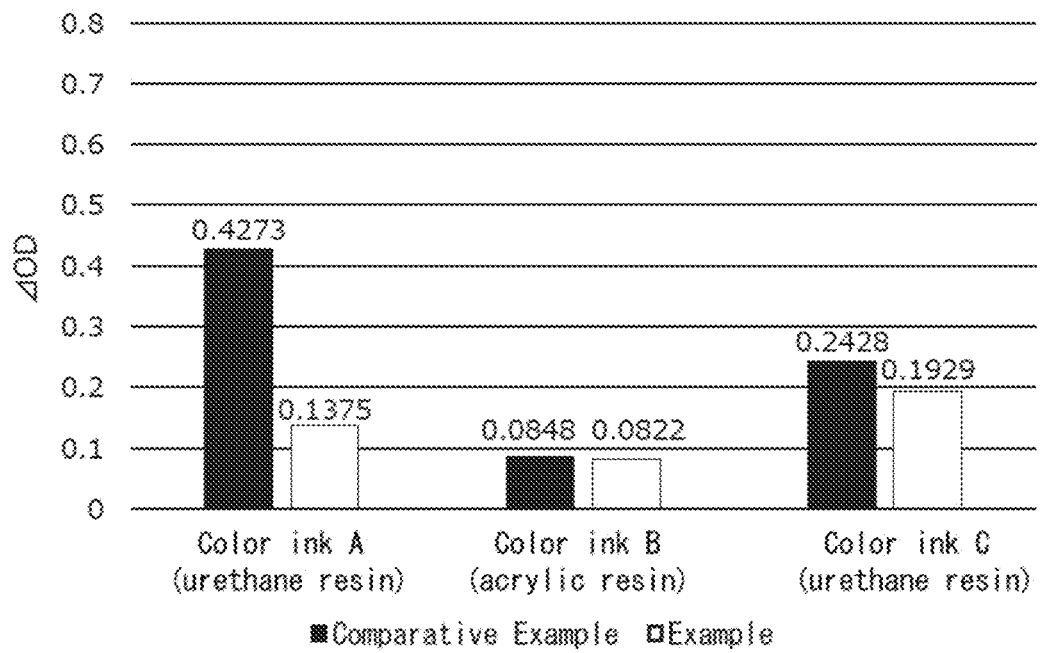
FIGS. 7A and 7B are graphs showing the results of a washing fastness evaluation in Example 1.
Figure 7B:
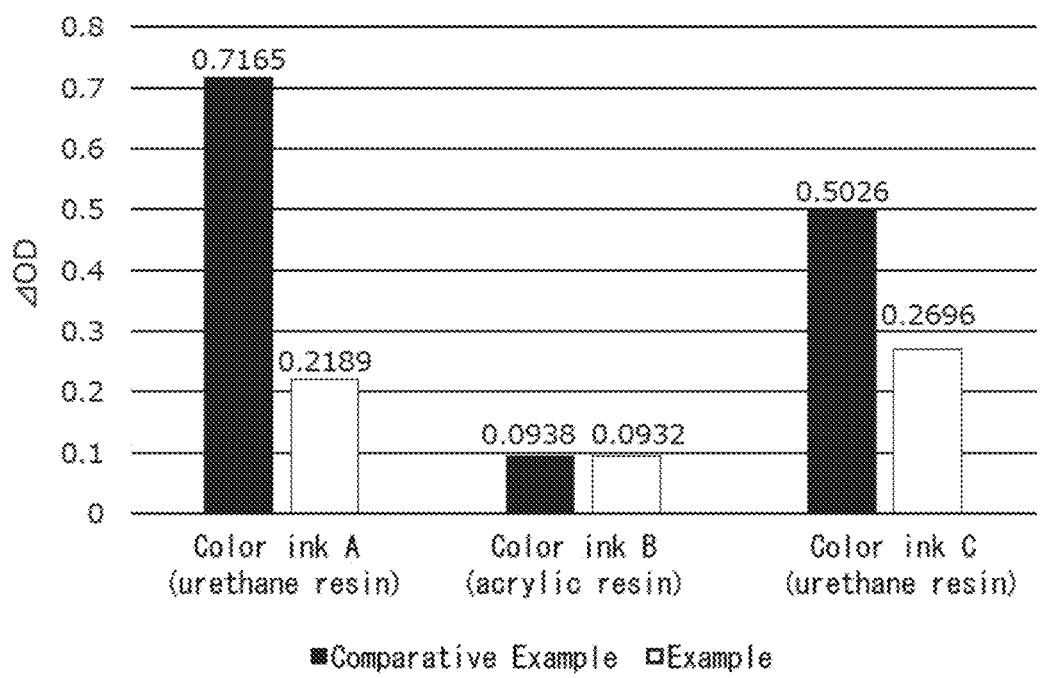

The results are shown in FIGS. 7A and 7B. FIGS. 7A and 7B are graphs showing the $\Delta OD$ values when color inks A to C are used. FIG. 7A shows the result when T-shirt A is used, and FIG. 7B shows the result when T-shirt B is used. In each of FIGS. 7A and 7B, the horizontal axis indicates the color inks A to C, in which the left bar indicates the result of Comparative Example and the right bar indicates the result of Example, and the vertical axis indicates the $\Delta OD$ value.

As shown in FIGS. 7A and 7B, the $\Delta OD$ value was reduced in Example as compared to in Comparative Example under both conditions. This shows that, even in the case of using a color ink containing either of the urethane aqueous resin emulsion and the acrylic aqueous resin emulsion, the washing fastness is improved by setting the order of applying the ink as in the present disclosure.

Further, as shown in FIGS. 7A and 7B, in particular, when the color inks A and C containing urethane resin as the aqueous resin emulsion were used, the $\Delta OD$ value was greatly reduced in Example as compared to in Comparative Example in both of the T-shirts A and B. This shows that in the case of using a color ink containing a urethane resin as the aqueous resin emulsion, the washing fastness is further improved as compared to a case of using a color ink containing an acrylic resin by setting the order of applying the ink as in the present disclosure.

Example 2

(Preparation of Color Ink)

As a color ink, an aqueous resin solution having the composition shown in Table 1 below was prepared. First, using urethane resins (UC001 to UC009) shown in Table 2 below as the resin, an ink solvent containing an aqueous resin emulsion was obtained by uniformly mixing the resin and pure water so as to have the above composition ratio. The types of the urethane resin are as follows. That is UC001 to UC003 are polycarbonate-based urethane resins, UC004 to UC006 are polyester-based urethane resins, and UC007 to UC009 are polyether-based urethane resins. Next, using a coloring agent (color: magenta) as a pigment, color inks U1 to U9 corresponding to the urethane resins (UC001 to UC009) were obtained by adding the ink solvent to the coloring agent and mixing uniformly so as to have the above composition ratio.

TABLE 1

| Component | Solid component ratio |
| --- | --- |
| Resin | 8% |
| Coloring agent | 3% |
| Pure water | 89% |

TABLE 2

| | Urethane resin | |
| --- | --- | --- |
| Sample name | Product name | Type of resin |
| UC001 | SUPERFLEX 460 | Carbonate |
| UC002 | TAKELAC W-6110 | Carbonate |
| UC003 | HYDRAN WLS-210 | Carbonate |
| UC004 | UCOAT UWS-145 | Ester |
| UC005 | TAKELAC W-5030 | Ester |
| UC006 | HYDRAN HW-920 | Ester |
| UC007 | TAKELAC W-6061T | Ether |
| UC008 | HYDRAN FCS-855 | Ether |
| UC009 | HYDRAN WLS-201 | Ether |

As the discharge printing ink, the discharge printing inks 1 and 2 of Example 1 were used. A portion including the ink-applied portion of each color was cut out and subjected to a total of five cycles of washing and drying using a household washing machine and a drying machine.

The washing fastness was evaluated in the same manner as in Example 1 in the case of using the color inks U1 to U9.

Next, the color inks U1 to U9 were divided into a group of color inks U1 to U3 (carbonate) containing a polycarbonate-based urethane resin, a group of color inks U4 to U6 (ester) containing a polyester-based urethane resin, and a group of color inks U7 to U9 (ether) containing a polyether-based urethane resin, and an average value of ΔOD values was calculated for each of the groups.

Figure 8A:
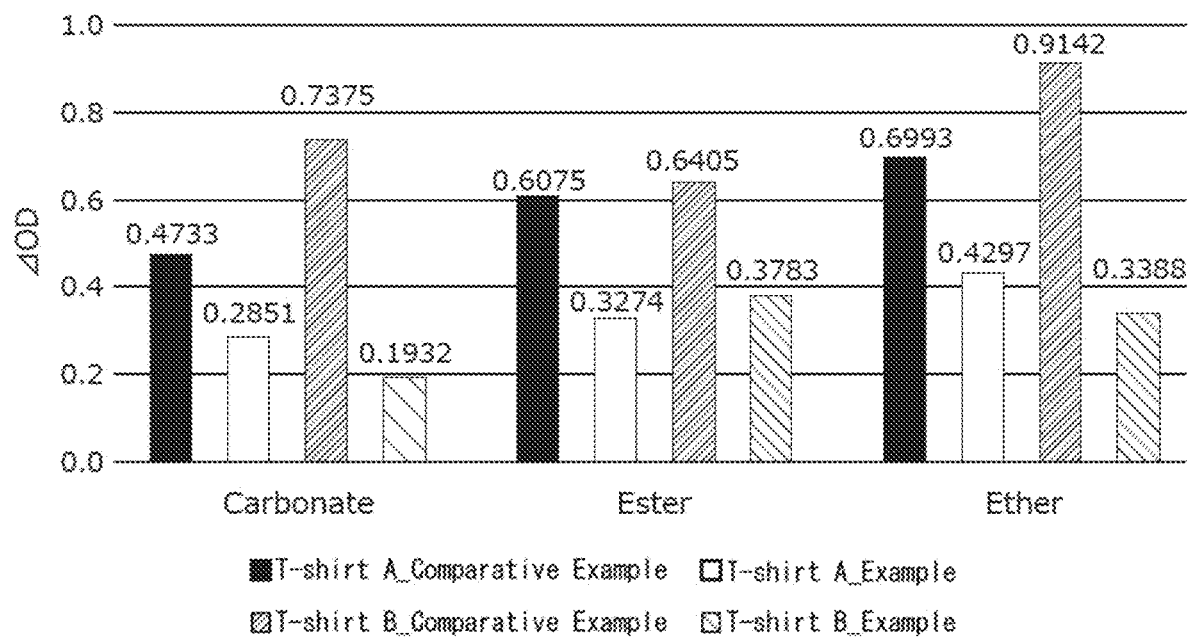
FIGS. 8A and 8B are graphs showing the results of a washing fastness evaluation in Example 2.
Figure 8B:
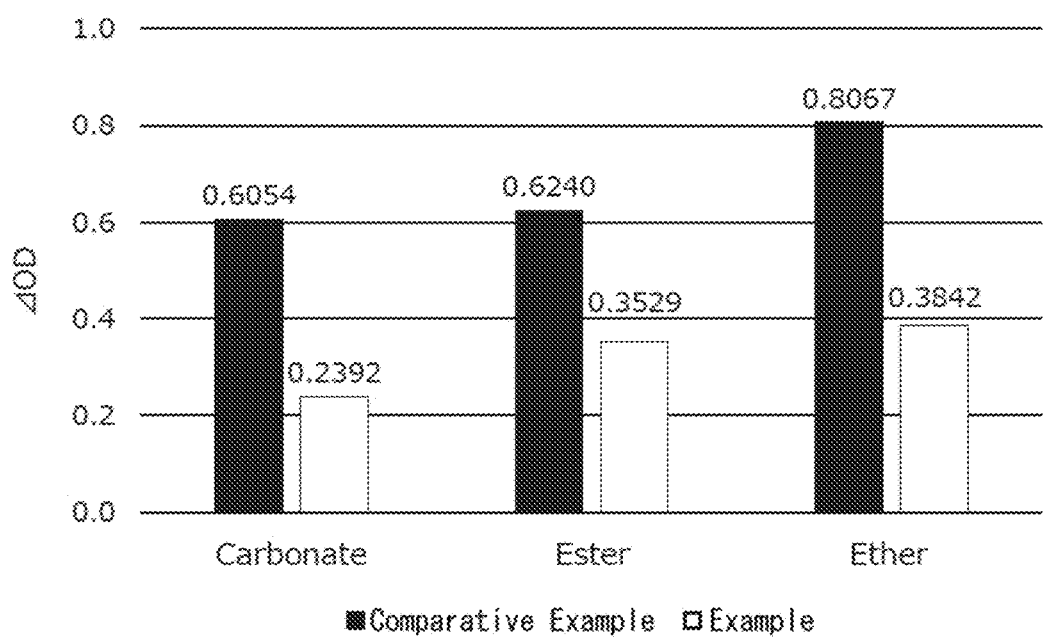

The results are shown in FIGS. 8A and 8B. FIGS. 8A and 8B are graphs showing an average value of ΔOD values in the case of using the color inks of each of the groups. FIG. 8A shows the result for each type of T-shirt. In FIG. 8A, the horizontal axis indicates groups of the carbonate, ester, and ether, each group showing the result of Comparative Example using the T-shirt A, the result of Example using the T-shirt A, the result of Comparative Example using the T-shirt B, and the result of Example using the T-shirt B from the left. In FIG. 8A, the vertical axis indicates the average value of ΔOD values. FIG. 8B shows the average value of the results of T-shirts A and B. In FIG. 8B, the horizontal axis indicates groups of the carbonate, ester, and ether, each group showing the result of Comparative Example and the result of Example from the left. In FIG. 8B, the vertical axis indicates the average value of ΔOD values.

As shown in FIG. 8A, the ΔOD value was reduced in Example as compared to in Comparative Example under both conditions. This shows that, even in the case of using a color ink containing any of a polycarbonate-based urethane resin, a polyester-based urethane resin, and a polyether-based urethane resin, the washing fastness is improved by setting the order of applying the ink as in the present disclosure.

Further, as shown in FIG. 8B, when a color ink containing a polycarbonate-based urethane resin was used, the ΔOD value in Example was low and the washing fastness was good as compared to a case where a color ink containing a polyester-based urethane resin or a polyether-based urethane resin was used. When a color ink containing a polyester-based urethane resin was used, the Δ OD value in Examples was low and the washing fastness was good as compared to a case where a color ink containing a polyether-based urethane resin was used. In addition, when a color ink containing a polyether-based urethane resin was used, as compared to a case where a color ink containing a polycarbonate-based urethane resin or a polyester-based urethane resin was used, the amount of decrease in Δ OD value was larger by setting the order of application of the ink as in the present disclosure, and the washing fastness was further improved by setting the order of application of the ink as in the present disclosure.

Example 3

(Aggregation Test)

The color ink A of Example 1 and the color inks U1 to U9 of Example 2 were used as the color ink, and the discharge printing inks 1 and 2 of Example 1 were used as the discharge printing ink.

2 ml of the discharge printing ink was placed in a commercially available test tube, and 20 μl of the color ink was dropped into the test tube. After the dropping, it was allowed to stand for 1 minute, and the contents of the test tube were suction-filtered using a 10 μm membrane filter. The contents remaining on the filter surface were observed with 50× magnification using an optical microscope and an image was obtained. The presence or absence of aggregates with a size of 300 μm or more on the filter surface was examined by naked eyes, and further, the area ratio of the aggregate in the image (a ratio (%) of an area of the aggregate in an area of the image) was calculated using image analysis software.

The results are shown in Tables 3 and 4. Table 3 shows the presence or absence and area ratio of the aggregate when the color ink A and the discharge printing ink 1 or 2 were used. Table 4 shows the presence or absence and area ratio of the aggregate when any of the color inks U1 to U9 and the discharge printing ink 1 were used.

TABLE 3

|  | Area ratio (%) | Presence or absence of aggregates with a size of 300 μm or more |
| --- | --- | --- |
| Discharge printing ink 1 | 70.429 | Present |
| Discharge printing ink 2 | 0 | Absent |

TABLE 4

|  | Area ratio (%) | Presence or absence of aggregates with a size of 300 μm or more |
| --- | --- | --- |
| Color ink U1 | 83.494 | Present |
| Color ink U2 | 90.306 | Present |
| Color ink U3 | 78.18 | Present |
| Color ink U4 | 58.836 | Present |
| Color ink U5 | 44.534 | Present |
| Color ink U6 | 1.037 | Absent |
| Color ink U7 | 36.01 | Present |
| Color ink U8 | 92.79 | Present |
| Color ink U9 | 82.029 | Present |

As shown in Table 3, when the color ink A and the discharge printing ink 1 were used, an aggregate was observed. On the other hand, when the color ink A and the discharge printing ink 2 were used, no aggregate was observed.

As shown in Table 4, when any of the color inks U1 to 5 or U7 to 9 and the discharge printing ink 1 were used, an aggregate was observed. On the other hand, when the color ink U6 and the discharge printing ink 1 were used, no aggregate was observed. The ink with which an aggregate is observed has high image quality because, for example, it reduces bleeding of an image forming portion.

INDUSTRIAL APPLICABILITY

As described above, the image forming apparatus of the present disclosure improves the washing fastness of the image forming portion of the fabric on which the discharge printing ink and the color ink are ejected.

REFERENCE SIGNS LIST

1: image forming apparatus
2: ink set storage
3: ink ejector
4: heat treatment section
5: controller

The invention claimed is:

1. An image forming apparatus, comprising:
a color ink ejector;
a discharge printing ink ejector; and
a controller, wherein
the color ink ejector is configured to eject a color ink containing an aqueous resin emulsion on a fabric, the discharge printing ink ejector is configured to eject a discharge printing ink containing a reducing agent on the fabric, and the controller is configured to control the color ink ejector and the discharge printing ink ejector to eject the color ink on the fabric in a first step, and after the first step, to eject the discharge printing ink on the fabric in a second step.

2. The image forming apparatus according to claim 1, wherein
the controller is configured to control the discharge printing ink ejector to eject the discharge printing ink on an area of the fabric on which the color ink is ejected in the second step.

3. The image forming apparatus according to claim 1, wherein
the color ink ejector is configured to eject the color ink containing the aqueous resin emulsion, the aqueous resin emulsion of the color ink being at least one selected from the group consisting of an acrylic resin emulsion, a urethane resin emulsion, a polyester resin emulsion, and a polystyrene resin emulsion.

4. The image forming apparatus according to claim 3, wherein
the color ink ejector is configured to eject the color ink containing the aqueous resin emulsion, the aqueous resin emulsion being a urethane resin emulsion.

5. The image forming apparatus according to claim 4, wherein
the color ink ejector is configured to eject the color ink containing the urethane resin emulsion, the urethane resin emulsion being at least one selected from the group consisting of a polycarbonate-based urethane resin emulsion, a polyester-based urethane resin emulsion, and a polyether-based urethane resin emulsion.

6. The image forming apparatus according to claim 5, wherein
the color ink ejector is configured to eject the color ink containing the urethane resin emulsion, the urethane resin emulsion being at least one of a polycarbonate-based urethane resin emulsion or a polyester-based urethane resin emulsion.

7. The image forming apparatus according to claim 5, wherein
the color ink ejector is configured to eject the color ink containing the urethane resin emulsion, the urethane resin emulsion being a polycarbonate-based urethane resin emulsion.

8. The image forming apparatus according to claim 5, wherein
the color ink ejector is configured to eject the color ink containing the urethane resin emulsion, the urethane resin emulsion being a polyether-based urethane resin emulsion.

9. The image forming apparatus according to claim 1, wherein
the color ink ejector is configured to eject the color ink containing the aqueous resin emulsion, the color ink being an ink that is aggregated by the discharge printing ink.

10. The image forming apparatus according to claim 9, wherein
the color ink ejector is configured to eject the color ink containing the aqueous resin emulsion, the color ink containing a pigment.

11. The image forming apparatus according to claim 1, wherein
the discharge printing ink ejector is configured to eject the discharge printing ink containing the reducing agent on the fabric, the reducing agent of the discharge printing ink being at least one selected from the group consisting of sodium hydrosulfite, thiourea dioxide, rongalite, sodium nitrite, sodium bisulfite, sodium thiosulfate, and sodium pyrosulfite.

12. The image forming apparatus according to claim 11, wherein
the discharge printing ink ejector is configured to eject the discharge printing ink containing the reducing agent on the fabric, the reducing agent of the discharge printing ink being at least one of thiourea dioxide or rongalite.

13. The image forming apparatus according to claim 11, wherein
the discharge printing ink ejector is configured to eject the discharge printing ink containing the reducing agent on the fabric, the reducing agent of the discharge printing ink being thiourea dioxide.

14. The image forming apparatus according to claim 1, wherein
the color ink ejector is configured to eject the color ink containing the aqueous resin emulsion, the aqueous resin emulsion being a urethane resin emulsion, and
the reducing agent of the discharge printing ink being thiourea dioxide.

15. The image forming apparatus according to claim 1, further comprising:
an ink set storage configured to store an ink set, wherein the ink set includes the color ink and the discharge printing ink.

16. An ink set stored in the ink set storage of the image forming apparatus according to claim 15, comprising:
a color ink; and
a discharge printing ink, wherein
the color ink contains an aqueous resin emulsion, and
the discharge printing ink contains a reducing agent.

17. An image forming method, comprising:
a first step of ejecting a color ink containing an aqueous resin emulsion on a fabric; and
a second step of ejecting a discharge printing ink containing a reducing agent on the fabric, wherein
the second step is performed after performing the first step.

* * * * *